United States Patent [19]

Icks

[11] Patent Number: 4,844,643
[45] Date of Patent: Jul. 4, 1989

[54] BORING AND MILLING TOOL AND INDEXABLE CUTTER BIT INSERT FOR USE THEREIN

[75] Inventor: Gerd Icks, Mössingen, Fed. Rep. of Germany

[73] Assignee: Montanwerke Walter GmbH, Tubingen, Fed. Rep. of Germany

[21] Appl. No.: 157,970

[22] Filed: Feb. 18, 1988

[30] Foreign Application Priority Data

Apr. 17, 1987 [DE] Fed. Rep. of Germany ....... 3713161

[51] Int. Cl.$^4$ ............................ B23C 5/20; B23C 5/04
[52] U.S. Cl. ........................................ 407/42; 407/114
[58] Field of Search ...................... 407/40, 42, 48, 51, 407/54, 113, 114

[56] References Cited

U.S. PATENT DOCUMENTS

| | | | |
|---|---|---|---|
| 3,399,442 | 9/1968 | Jones et al. | 407/114 |
| 3,947,937 | 4/1976 | Hertel | 407/114 |
| 3,968,550 | 7/1976 | Gehri | 407/114 |
| 4,214,847 | 7/1980 | Kraemer | 407/114 |
| 4,215,957 | 8/1980 | Holma et al. | 407/114 |
| 4,273,480 | 6/1981 | Shirai et al. | 407/114 |
| 4,564,321 | 1/1986 | Kondo et al. | 407/42 |
| 4,659,264 | 4/1987 | Friedline | 407/42 |

FOREIGN PATENT DOCUMENTS 2210816 9/1973 Fed. Rep. of Germany ...... 407/114
7935032 3/1980 Fed. Rep. of Germany .
3209821 9/1983 Fed. Rep. of Germany .

Primary Examiner—Frederick R. Schmidt
Assistant Examiner—William E. Terrell
Attorney, Agent, or Firm—Frishauf, Holtz, Goodman & Woodward

[57] ABSTRACT

A boring and milling tool for machining of metal workpieces includes an essentially cylindrical, elongated basic milling body, with at least one chip removal groove machined into its circumference, penetrating the face end of the boring and milling tool. A pocket is provided in this chip removal groove for an indexable cutter bit insert (16) retained therein. One cutting edge (24, 26) of the insert operates circumferentially, and another cutting edge (25, 27) operates at the face end with respect to the boring and milling tool. To prevent the production of long chips at the end cutting edge (25, 27) of the insert (16) during boring operations with the boring and milling tool, the insert (16) here has a different cutting edge geometry than at the cutting edge (24, 26) that is effective during milling.

22 Claims, 4 Drawing Sheets

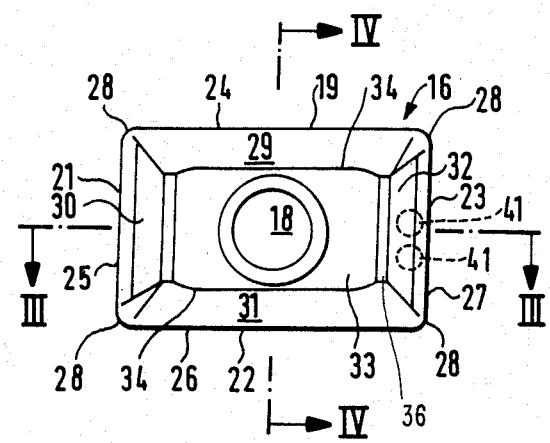
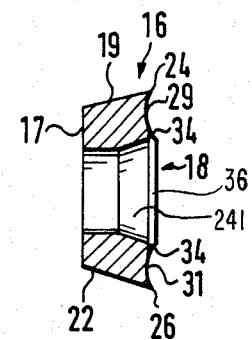
Fig. 2
Fig. 4
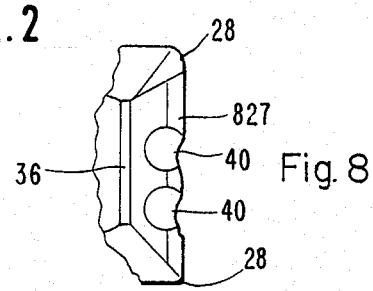
Fig. 8
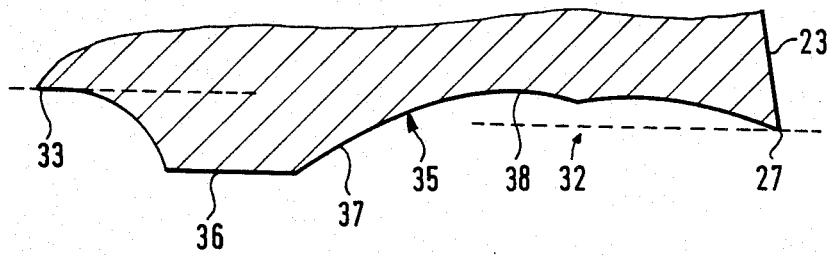
Fig. 3

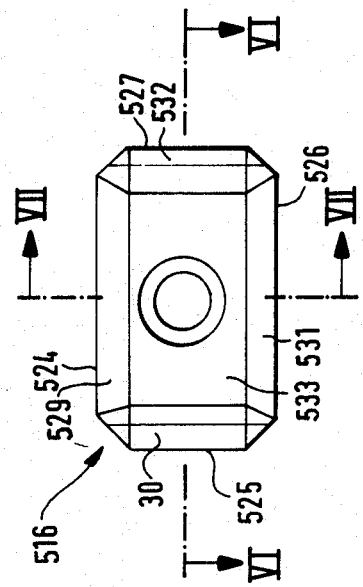
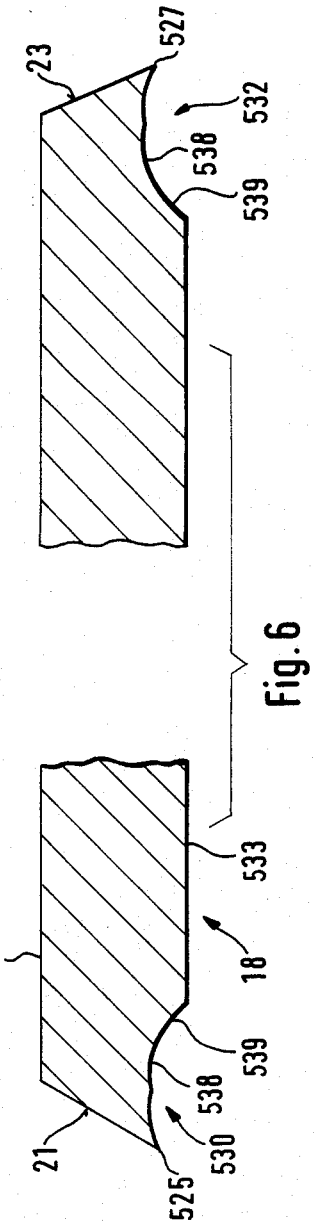

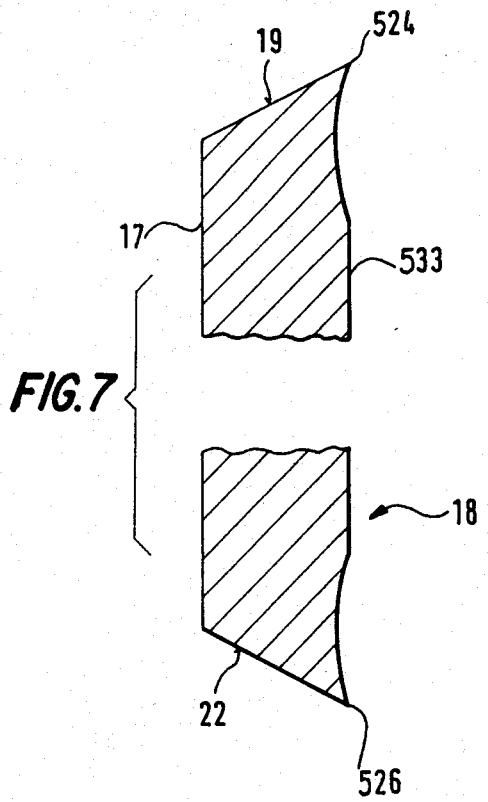

BORING AND MILLING TOOL AND INDEXABLE CUTTER BIT INSERT FOR USE THEREIN

REFERENCE TO RELATED DISCLOSURE

German Patent Disclosure Document DE-OS No. 32 09 821.

The present invention relates to boring and milling tools having a shank-like body formed with at least one, and preferably two chip removal grooves, and to indexable cutter bit inserts to be secured to the shank-like body; and more particularly to the specific geometry of the indexable cutter bit insert so that, in operation of the tool, cut chips will be readily removed through the chip removal groove.

BACKGROUND

The referenced German Patent Disclosure Document DE-OS No. 32 09 821 describes a milling and boring tool element of the type to which the present invention relates. Such a boring tool element has an elongated, essentially cylindrical shank which has spirally extending chip removal grooves. A plurality of pockets are located in the chip removal grooves in which indexable cutter bit inserts are retained. One of these cutter bit inserts is located at the cutting end of the shank radially outwardly. The cutter bit insert has two cutting edges, one extending axially and one extending radially. That cutter bit insert, during boring, removes material from a workpiece by the axially forward cutting edge. During milling, the cutting edge which extends parallel to the axis of rotation, and hence longitudinally of the cutting tool, is effective.

Since in the known boring and milling tool all the cutting edges of one indexable cutter bit insert have the same geometry, a long integral cutter chip is produced on the cutting edge performing the boring operation. Long chips of this kind may occur in the form either a spiral or a ribbon, depending on the material being machined. Both types of chip are extremely troublesome and tend to damage the tool and/or the workpiece.

In the case of the ribbon-shaped chip, a further disadvantage is that it shoots out of the hole being bored at very high speed.

During milling, contrarily, long chips cannot be produced. Their length is intrinsically limited to one-half the circumference of the milling tool. They also have an approximately crescent-shaped form in cross section and so can easily be compressed.

THE INVENTION

It is an object to provide a boring and milling tool, especially for metallic workpieces, and an indexable cutter insert therefor which is equally effective both for boring as well for milling a groove, or bore hole.

Briefly, the cutter bit insert is essentially of parallelogram shape and has two essentially parallel end cutting edges as well as two essentially parallel milling cutting edges. The end cutting edges and milling cutting edges, of course, due to the parallel configuration, then will be adjacent each other. In accordance with the feature of the invention, the cutting edge geometry or shape of each of the two respective essentially parallel cutting edges is essentially the same, so that the two milling cutting edges and the two end cutting edges will be essentially identical; however, the cutting edge geometries or shapes of two adjacent cutting edges will be different; that is, the milling cutting edges for boring and the end cutting edges will differ from each other. The boring or milling tool, having an indexable cutter bit of this type secured in a pocket, dimensioned and shaped to receive the cutter bit, will thus be equally adaptable for boring operations and for milling operations, thereby providing a tool element of substantially enhanced utility and versatility.

The different cutting geometries are arranged such that the respective difference functions are optimized regarding the respective use to which they will be put.

Once an indexable insert of this kind has been inserted into the pocket located radially on the outside of the milling tool tip, boring of the same quality as is otherwise achieved with tools designed strictly for boring can also be achieved with the boring and milling tool thus obtained. On the other hand, milling with a boring and milling tool of this type is unimpaired and is accomplished with the same quality as that known for shank-like milling tools having circumferential cutting edges.

In accordance with a feature of the invention, and to prevent the production of long chips during boring with the novel boring and milling tool, a separate chip breaking arranement can be provided on two end cutting edges parallel to one another. The other two parallel cutting edges, i.e. the milling edges, are free of such chip breaking arrangements.

In this way the progress of the chips produced during milling, which do not need breaking, is unhindered. This is favorable in terms of the drive power of a machine tool equipped with a milling tool of this type, because during milling no additional deformation work need be brought to bear for the chips that have been severed. The boring cutting edge is in any case inoperative after the boring operation has been terminated, as soon as the convex cone that may optionally be present at the bottom of the bore hole is removed by the boring cutting edge after the milling. During the removal of this cone, it is true that the driving machine must perform additional work in deforming the chips produced by the boring tool during milling, but this is limited to a distance in the milling direction that is equivalent to the diameter of the milling tool. As a result, only short, harmless chips are produced during the boring operations.

These chip breaking arrangements can be produced either by locating the plateau surface delimited by the chip removal surfaces at a higher level than the two end cutting edges that extend parallel to one another, but not exceeding the height of the two miling edges, or alternatively by forming two strips on the plateau surface that extend parallel to the associated end cutting edges, while the plateau surface is located at a lower level than the cutting edges located at the lowermost level.

Breaking of the chip is improved if the bowl-shaped chip removal surface at the foot of the chip breaking arrangement has a further bowl-shaped depression that extends parallel to and spaced apart from the cutting edge.

A further improvement in the production of and breaking of chips during the boring operation can be attained if the chip removal surfaces adjoining the cutting edges with which chip breaking arrangements are associated have one or more depressions distributed in the cutting direction, these depressions either terminating before the cutting edge or penetrating the cutting edge, resulting in an undulating cutting course.

DRAWINGS

FIG. 2 is a top view of the indexable cutter bit insert, mounted radially on the outside of the face end, in accordance with the invention;

FIG. 3 is a fragmentary section, taken along the line III—III of FIG. 2, of the indexable insert of FIG. 2;

FIG. 4 is a side view, in a section taken along the line IV—IV, of the indexable insert of FIG. 2;

FIG. 5 is a top view of another exemplary embodiment of the indexable insert according to the invention having a plateau surface that is raised by comparison with the cutting edges performing the boring operation;

FIG. 6 is a side view, on a larger scale and shortened, of the indexable insert of FIG. 5, shown in a section taken along the line VI—VI;

FIG. 7 is an enlarged and shortened side view of the indexable insert of FIG. 5, in a section taken along the line VII—VII; and FIG. 8 is a fragmentary top view of an indexable insert and illustrating an undulating cutting edge.

DETAILED DESCRIPTION

Figure 1:
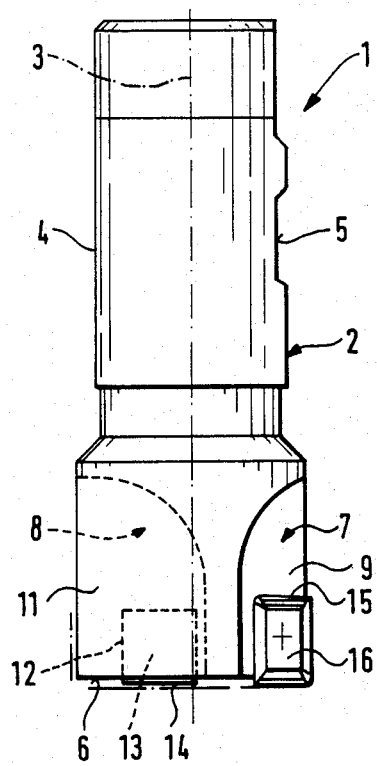
FIG. 1 is a side view of a boring and milling tool according to the invention.

In FIG. 1 a boring and milling tool 1 is shown, which has an elongated, approximately cylindrical basic milling body 2 having a longitudinal axis 3. The upper portion of the shank-like milling body 2 forms a clamping shank 4, which has flat surfaces 5 serving as rotation-slippage preventing means on its circumference in a known manner. The lower portion of the basic milling body 2, which terminates at a lower face end 6 and adjoins the clamping shank 4, includes in its circumference two chip grooves 7 and 8 that are open in both the radial direction and in the direction toward the face end 6. The chip grooves 7 and 8, which have a V-shaped rectangular cross section, extend parallel to the longitudinal axis 3. Their flat, approximately radially extending rear surfaces 9 and 11 extend in opposite directions with respect to the longitudinal axis 3, so that each rear surface 9 and 11 is oriented in the direction of rotation of the boring and milling tool 1.

The chip groove 8 has a greater radial depth than the chip groove 7, so that it extends beyond the longitudinal axis 3, which is also the axis of rotation of the boring and milling tool 1. The chip groove 7, contrarily, terminates at a considerable radial distance from the longitudinal axis 3.

A pocket 12 for receiving a quadrilateral indexable cutter bit insert 13 is machined into the rear surface 11 and is located and shaped such that a cutting edge 14 of the indexable insert 13 extends on a radius of the longitudinal axis 3 and intersects the longitudinal axis 3, so that the cutting edge 14, which protrudes beyond the face end 6, extends a short distance beyond the longitudinal axis 3. The cutting edge 14 also terminates radially inside the milling diameter of the boring and milling tool 1.

A pocket 15 for a second indexable cutter bit insert 16 is machined into the chip groove 7 as well, in the rear surface 9.

While the indexable insert 13 that does not extend as far as the circumference of the boring and milling tool 1 is effective only during boring, the indexable insert 16 is effective in both boring and milling, because one of its cutting edges protrudes at the circumference of the boring and milling tool 1 and the other cutting edge protrudes beyond the face end 6. The indexable insert 16 has the shape shown in FIGS. 2-4.

The indexable insert 16 is a quadrilateral, parallelogram-shaped perforated plate having a flat backside 17, a textured top 18 extending parallel to and spaced apart from the backside, and four side faces or clearance or rake edges 19, 21, 22 and 23 forming the outer circumference of the indexable insert 16, which extend between the backside 17 and the top 18. The clearance surfaces 19, 21, 22 and 23 are flat surfaces that are inclined with respect to the backside 17 by an angle corresponding to the desired clearance. A through bore 24' is located centrally in the indexable insert 16 and serves to receive a fastening screw for retention of the indexable insert 16 in the boring and milling tool 1.

The transition edge from the respective clearance surfaces 19, 21, 22, 23 to the top 18 defines the cutting edges. The indexable insert 16 therefore has a total of four cutting edges 24, 25, 26, and 27 extending in a straight line, which extend parallel to one another in pairs and are all located at the same level with respect to the backside 17. Where adjacent cutting edges 24-27 meet, the indexable insert 16 is chamfered, forming a secondary cutting edge 28. The angle between the cutting edges 25 and 26, and between the cutting edges 24 and 27, is 88°.

In the direction toward the center of the indexable insert 16, each of the cutting edges 24-27 is adjoined by a bowl-shaped chip removal surface, which adjacent to the respective cutting edges 24-27 is shaped such that a positive chip angle results in each case, when the indexable insert 16 is at a neutral depth. The chip removal surfaces 29 and 31 (FIGS. 2 and 4) that are parallel to one another are identical to one another, and the chip removal surfaces 30 and 32 are also identical to one another, but the chip removal surfaces 30 and 29, on the one hand, and 30 and 31 differ from one another such that the two chip removal surfaces 29 and 31 are optimized for the sake of maximally favorable cutting during milling operation, while the chip removal surfaces 30 and 32 are optimized in terms of good chip production during boring operations.

The chip removal surfaces 29-32 formed in the top 18, which measured in the direction toward the center of the indexable insert have approximately the same width, together delimit a plateau surface 33 that is flat and parallel to the backside 17 and which with respect to the backside 17 is located not higher than, and preferably even lower than, a plane that includes the four cutting edges 24-27. In other words, the platueau surface 33 extends as far as the end of the respective chip removal surfaces 29-32 oriented toward the interior of the insert.

With a simple rectilinear edge 34, which is located opposite the associated milling cutting edge 24, 25, the chip removal surfaces 29 and 31 merge with the plateau surface 33, the edge 34 extending parallel to the respective milling edges 24 and 26. In the case of the end cutting edges 25 and 27 that are effective during boring, contrarily, a chip breaker arrangement 35 is formed at the transition to the plateau surface 33 on the end of each of the chip removal surfaces 30 and 32 located toward the interior of the insert. As FIG. 3 shows, in a cross-sectional view through the chip removal surface 32, this chip breaking arrangement 35 includes a ridge or strip 36 protruding from the plateau surface 33, extending parallel to and spaced apart from the associated cutting edge 27 and 35, respectively, and rising above the plane defined by the cutting edges 24–27. On its side oriented toward the associated end cutting edge 25 or 27, the strip 36 forms an inclined ramp 37, which drops at an angle of approximately 30° with respect to the plane defined by the cutting edge 24–27. At the point where the ramp 37 penetrates this plane, it merges with a depression 38, which is formed in the chip removal surface 32 and is located at a lower level than this surface 32. A cutting edge geometry of this kind, as is provided in the region between the strip 36 and the associated cutting edge 27, is also known by the term "twin chip guide stage".

As a result, a chip severed by the cutting edge 27 during boring initially slides over the chip removal surface 32, until it reaches the vicinity of the depression 38, where the back of the boring chip loses contact with the indexable insert 16. The back of the moving chip does not contact the indexable insert 16 again until the vicinity of the inclined ramp 37, at which the chip moving past it is compressed or bent transversely to the direction of movement, and this breaks the chip.

Accordingly, while the chip that is severed from the workpiece by the milling edge 24 or 26 can be removed without hindrance, the chip severed by the end cutting edge 27 or 25 meets the strip-like ridge 36 and is broken there.

Accordingly, the indexable insert 16 has different cutting geometries at two adjoining cutting edges 24–27, while milling edges 24, 26 or end cutting edges 25, 27 that are respectively parallel to one another are each provided with the same cutting geometry. As a result, an adaptation to the respective intended use is attained, because the end cutting edges 25 or 27, when the indexable insert 16 is inserted into the boring and milling tool 1, form the cutting edge that is active at the face end and during boring, while the cutting edges 24 or 26 are located radially outward on the circumference so that they can cut during the milling operation, in which the chip in any case intrinsically terminates after a one-half rotation of the milling tool.

When the indexable insert 16 shown in FIGS. 2–4 is used, relatively short chips are produced both during boring and milling, for the above reasons; in any case, long spiral or ribbon-shaped cips are avoided during boring as well.

A different geometry of the indexable cutter bit insert 16, with which the same goal can be attained, is shown in FIGS. 5–7. In these figures, the same reference numerals, raised by 500, are used for components described above.

The indexable cutter bit insert 516 of FIGS. 5–7 uses, instead of the strip-like ridges 36, a raised plateau surface 533 and cutting edges 524–527, which are located at various levels with respect to the backside 17.

As FIG. 7 shows, the plateau surface 533, which is again delimited on all sides by the chip removal surfaces 529–532, is located at the same level as or at a somewhat lower level than the two milling edges 524 and 526. The two end cutting edges 525 and 527 used for boring, contrarily, are located markedly lower than the plateau surfaces 533, as FIG. 6 shows. In this way, at the transition between the plateau surface 533 and the chip removal surface 532 or 530, a flank 539, which extends in the same manner as the ramp 37 in the exemplary embodiment of FIGs. 2–4 and is inclined obliquely in the direction toward the associated end cutting edge 525 or 527, results. At the foot of the flank 539, once again, the above-described bowl-shaped depression 538 is formed in the chip removal surface 530 or 532. The raising of the plateau surface 533 with respect to the end cutting edges 525 and 527 again produces the cutting edge geometry known by the term "twin chip guide stage".

In the embodiment of the indexable insert in FIGS. 5–7, the two milling edges 524 and 526 are located at a first level with respect to the backside 17, this level being located above the plateau surface 533, while the end cutting edges 525 and 527 used for boring are located in a plane that is located closer to the backside 17 than the plateau surface 533 is. The metal chip severed by the milling edges 524 and 526 can therefore easily move away unhindered from the plateau surface 533, while the chip severed by the end cutting edges 525 and 527 meets the ramp 539 and thus undergoes an impact that breaks it.

Easier breakage of the chip during boring may be obtained by forming recesses 40 (FIG. 8) and/or 41 (FIG. 2) in the chip removal surface 30 or 32. The recesses 41 have been shown in broken lines in FIG. 2, since they are optional. A plurality of these recesses 40 or 41 are located beside one another along the corresponding end cutting edge 25, 27 and either, as in the case of the recess 40 (FIG. 8), penetrate the associated cutting edge 25 or 827, or like the recesses 41 of FIG. 2, terminate before the cutting edge 25, 27. In the one case an approximately undulating or wave-shaped course of the cutting edge 827 (FIG. 8) results, while in the other case the straight course of the cutting edge is maintained. The recesses 40 or 41 give the back of the cut-off chip an undulating or corrugated course, so that even under unfavorable conditions it tends to break off faster, with the aid of the flank 539 or ramp 37, than a smooth back, if the workpiece is made of a metal that can readily be shaped, e.g. a soft or ductile metal.

Various changes and modifications may be made and features described in connection with any one of these embodiments may be used with any of the others, within the scope of the inventive concept.

I claim:

1. Boring and milling tool for metallic workpieces comprising the combination of an elongated shank-like body (2) rotatable about an axis of rotation (3) and defining a cutting end;

at least one chip removal groove (7, 8) extending from the cutting end, axially with respect to the shank-like body; and an indexable cutter bit insert receiving pocket (12, 15) formed in the at least one chip removal groove to receive an indexable cutter insert, with an indexable cutter insert (13, 16) which, in plan view, is subtantially parallelogram-shaped and defines two essentially parallel end cutting edges (25, 27, 827), two essentially parallel milling cutting edges (24, 26), and transition zones between adjacent end cutting edges and milling cutting edges, and wherein the cutting edge geometry or shape of each two respectively essentially parallel cutting edges (24, 26; 25, 27, 827) is essentially the same;

the cutting edge geometries or shapes of two adjacent cutting edges (24, 25; 25, 26; 26, 27, 827; 27, 827, 24) are different;

the cutting edges geometries of the respective cutting edges are constant throughout their lengths;

two chip breaking arrangements are provided, formed on the indexable inserts, associated with each of the essentially parallel end cutting edges (25, 27, 827) and extending essentially over the lengths of the respective end cutting edges; and wherein the milling cutting edges (24, 26) of said inserts are free from said chip breaking arrangements.

2. Boring and milling tool for metallic workpieces comprising the combination of claim 1 further including chip removal surfaces (29, 30, 31, 32) extending inwardly from the cutting edges (24, 26; 25, 27, 827);

wherein the milling cutting edges define, at the intersection with a top surface of the cutter bit insert, an inwardly positioned plateau surface (33), said plateau surface being at a plane parallel to a backside (17) of the indexable insert (16) and at a level which is essentially defined by the milling cutting edges (24, 26);

and wherein the end cutting edges (25, 27, 827) are lower than said plateau surface.

3. Boring and milling tool for metallic workpieces comprising the combination of claim 1 further including chip removal surfaces (29, 30, 31, 32) extending inwardly from the cutting edges (24, 26; 25, 27, 827);

wherein the milling cuttng edges define, at the intersection with a top surface of the cutter bit insert, an inwardly positioned plateau surface (33), said plateau surface being at a plane parallel to a backside (17) of the indexable insert (16) and at a level which is essentially defined by the lowest of the cutting edges (24, 26; 25, 27, 827);

and wherein the chip breaking arrangements comprise two ridges or projecting strips (36) projecting above said plane, extending parallel to each other and parallel to the associated end cutting edges (25, 27, 827) and delimiting the chip removal surfaces (30, 32) associated with the end cutting edges.

4. Boring and milling tool for metallic workpieces comprising the combination of claim 1 further including chip removal surfaces extending towards inward surface regions of the insert (16) from the end cutting edges (25, 27, 827);

and wherein said chip removal surfaces are formed with bowl or groove-like depressions (38) whereby, in cross section, said chip removal surface will have a curved aspect.

5. Boring and milling tool for metallic workpieces comprising the combination of claim 1 wherein the end cutting edges are of undulating, or wave-shape.

6. Boring and milling tool for metallic workpieces comprising the combination of claim 1 wherein, chip removal surfaces are formed extending from the respective end cutting edges towards a central region of the insert; and wherein at least one of the chip removal surfaces is formed with at least one recess (40, 41).

7. Boring and milling tool for metallic workpieces comprising the combination of claim 6 wherein the at least one recess (41) is located inwardly of the end cutting edge (27) without intersecting said end cutting edge.

8. Boring and milling tool for metallic workpieces comprising the combination of claim 6 wherein at least one of the recesses (40) intersects the end cutting edge (827).

9. Boring and milling tool for metallic workpieces comprising the combination of claim 1 wherein the indexable insert (16) comprises an essentially rhomboidal element;

and wherein the smaller angle of two adjacent cutting edges (24, 25; 25, 26; 26, 27, 827; 27, 827, 24) is between about 75° and 90°, and preferably of about 88°.

10. Boring and milling tool for metallic workpieces comprises the combination of claim 9, wherein al of said cutting edges are in a common plane.

11. Boring and milling tool for metallic workpieces comprising the combination of claim 1 wherein all of said cutting edges are in a common plane.

12. An indexable cutter bit insert (16) of essentially rhomboidal, and, in plan view, substantially parallelogram shape and having two essentially parallel end cutting edges (25, 27, 827) two essentially parallel milling cutting edges (24, 26), and transition zones between adjacent end cutting edges and milling cutting edges;

and wherein the cutting edge geometry or shape of each of two respectively essentially paralel cutting edges (24, 26; 25, 27, 827) is essentially the same;

the cutting edge geometries or shapes of two adjacent cutting edges (24, 25; 25, 26; 26, 27, 827; 27, 827, 24) are different;

the cutting edges geometries of the respective cutting edges are constant throughout their lengths;

two chip breaking arrangements are provided, formed on the indexable inserts, associated with each of the essentially parallel end cutting edges (25, 27, 827) and extending essentially over the lengths of the respective end cutting edges; and wherein the milling cutting edges (24, 26) of said inserts are free from said chip breaking arrangements.

13. The insert of claim 12 further including chip removal surfaces (29, 30, 31, 32) extending inwardly from the cutting edges (24, 26; 25, 27, 827);

wherein the milling cutting edges define, at the intersection with a top surface of the cutter bit insert, an inwardly positioned plateau surface (33), said plateau surface being at a plane parallel to a backside (17) of the indexable insert (16) and at a level which is essentially defined by the milling cutting edges (24, 26);

and wherein the end cutting edges (25, 27, 827) are lower than said plateau surface.

14. The insert of claim 12 further including chip removal surfaces (29, 30, 31, 32) extending inwardly from the cutting edges (24, 26; 25, 27, 827);

wherein the milling cutting edges define, at the intersection with a top surface of the cutter bit insert, an inwardly positioned plateau surface (33), said plateau surface being at a plane parallel to a backside (17) of the indexable insert (16) and at a level which is essentially defined by the lowest of the cutting edges (24, 26; 25, 27, 827);

and wherein the a chip breaking arrangment comprise two ridges or projecting strips (36) projecting above said plane, extending parallel to each other and parallel to the associated end cutting edges (25, 27, 827) and delimiting the chip removal surfaces (30, 32) associated with the end cutting edges.

15. The insert of claim 12 further including chip removal surfaces extending towards inward surface regions of the insert (16) from the end cutting edges (25, 27, 827);

and wherein said chip removal surfaces are formed with bowl or groove-like depressions (38) whereby, in cross section, said chip removal surface will have a curved aspect.

16. The insert of claim 12
wherein the end cutting edges are of undulating, or wave-shape.

17. The insert of claim 12
wherein, chip removal surfaces are formed extending from the respective end cutting edges towards a central region of the insert; and
wherein at least one of the chip removal surfaces is formed with at least one recess (40, 41).

18. The insert of claim 17 wherein the at least one recess (41) is located inwardly of the end cutting edge (27) without intersecting said end cutting edge.

19. The insert of claim 17 wherein at least one recess (40) intersects the end cutting edge (827).

20. The insert of claim 12 wherein the indexible insert (16) comprises an essentially rhomboidal element;
and wherein the small angle of two adjacent cutting edges (24, 25; 25, 26; 26, 27, 827; 27, 827, 24) is between about 75° and 90°, and preferably of about 88°.

21. The insert of claim 12 wherein all of said cutting edges are in a common plane.

22. The insert of claim 20, wherein all of said cutting edges are in a common plane.

* * * * *